US009644751B2

(12) United States Patent
Binder (10) Patent No.: US 9,644,751 B2
(45) Date of Patent: May 9, 2017

(54) THREE-DIMENSIONAL FLOW-OPTIMIZED CONTROL SLIDER SYSTEM WITH LINEAR CONTROL BEHAVIOR (71) Applicant: Binder GmbH, Ulm (DE)

(72) Inventor: Robert Binder, Laichingen (DE)

(73) Assignee: Binder GmbH, Ulm (DE)

(*) Notice: Subject to any disclaimer, the term of this patent is extended or adjusted under 35 U.S.C. 154(b) by 127 days.

(21) Appl. No.: 14/665,458

(22) Filed: Mar. 23, 2015

(65) Prior Publication Data
US 2015/0240953 A1 Aug. 27, 2015

Related U.S. Application Data (63) Continuation of application No. PCT/EP2013/069773, filed on Sep. 24, 2013.

(30) Foreign Application Priority Data

Sep. 24, 2012 (DE) .................. 10 2012 018 763

(51) Int. Cl.
*B01F 3/04* (2006.01)
*F04D 15/00* (2006.01)
(Continued)

(52) U.S. Cl.
CPC ............ *F16K 3/06* (2013.01); *B01F 3/04255* (2013.01); *B01F 3/04829* (2013.01);
(Continued)

(58) Field of Classification Search
CPC .... B01F 3/04; B01F 3/04099; B01F 3/04255; F04D 15/00; F04D 15/0005; F16K 21/00; F16K 17/00
(Continued)

(56) References Cited

U.S. PATENT DOCUMENTS 3,180,360 A 4/1965 Pavlin
3,317,184 A 5/1967 Usry
(Continued)

FOREIGN PATENT DOCUMENTS

CN 102076616 5/2011
EP 0301578 A2 7/1988
(Continued)

OTHER PUBLICATIONS

Office Action for Chinese Patent Application No. 201380049694.1, dated Feb. 3, 2016.
(Continued)

*Primary Examiner* — Robert A Hopkins
(74) *Attorney, Agent, or Firm* — Harness, Dickey & Pierce, P.L.C.

(57) ABSTRACT

A regulating slide valve apparatus having a housing which forms a duct through which a gaseous or liquid medium can flow having an inlet longitudinal portion, an outlet longitudinal portion, and an adjustable regulating element for varying the flow cross section of the duct and adjusting the throughflow rate. A seat ring element is provided in the duct, the regulating element has a first longitudinal portion which has a circular cross section with diameters that vary in the longitudinal direction, and the regulating element is adjustable in the longitudinal direction of the duct along an adjustment travel. In a closure position the regulating element lies against the seat ring element and closes the duct and, in an open position, forms an annular gap through which flow can pass, with the seat ring element. The varying diameters along the first longitudinal portion of the regulating element are configured such that the change in the cross-sectional area through which flow can pass, of the annular gap with the adjustment of the regulating element in the longitudinal direction, is such that the volume flow
(Continued)

through the annular gap varies approximately linearly with the adjustment of the regulating element along the adjustment travel.

16 Claims, 6 Drawing Sheets

(51) Int. Cl.
*F16K 3/06* (2006.01)
*F16K 31/50* (2006.01)
*F16K 31/53* (2006.01)
*F16K 1/06* (2006.01)
*F16K 1/12* (2006.01)
*F16K 1/54* (2006.01)
*B01F 15/02* (2006.01)
*C02F 1/74* (2006.01)

(52) U.S. Cl.
CPC ............ *B01F 15/0261* (2013.01); *C02F 1/74* (2013.01); *F04D 15/0005* (2013.01); *F16K 1/06* (2013.01); *F16K 1/12* (2013.01); *F16K 1/54* (2013.01); *F16K 31/508* (2013.01); *F16K 31/53* (2013.01); *B01F 2003/04865* (2013.01); *B01F 2003/04943* (2013.01); *B01F 2215/008* (2013.01); *B01F 2215/0052* (2013.01); *C02F 2303/10* (2013.01)

(58) Field of Classification Search
USPC ................... 137/115.2; 210/220; 261/78.2
See application file for complete search history.

(56) References Cited

U.S. PATENT DOCUMENTS

| | | | |
|---|---|---|---|
| 3,520,324 | A | 7/1970 | Meregalli |
| 4,593,881 | A | 6/1986 | Yoshino |
| 5,782,410 | A | 7/1998 | Weston |
| 2008/0111089 | A1 | 5/2008 | Hasunuma |
| 2011/0114545 | A1 | 5/2011 | Hoefken et al. |
| 2011/0174270 | A1* | 7/2011 | Harhoff ............... F02M 63/005 123/456 |

FOREIGN PATENT DOCUMENTS

| | | |
|---|---|---|
| EP | 1 092 834 A2 | 5/2000 |
| EP | 1 512 892 A1 | 9/2004 |
| EP | 2 463 558 A1 | 12/2010 |
| EP | 1512892 A1 | 5/2011 |
| JP | H01120912 | 5/1989 |
| JP | H07301345 A | 11/1995 |
| JP | 11325264 | 11/1999 |
| JP | 2006292137 A | 10/2006 |
| JP | 2007198893 A | 8/2007 |

OTHER PUBLICATIONS

German Examination Report with included English Translation for DE 10 2013 110 518.1 which issued Jul. 28, 2015 (14 pages).
International Search Report and Written Opinion for PCT/EP2013/069773; dated Jan. 3, 2014; 10 pages.
Office Action in Japanese Patent Application No. 2015-532446 mailed Mar. 29, 2016, and English translation.

* cited by examiner

THREE-DIMENSIONAL FLOW-OPTIMIZED CONTROL SLIDER SYSTEM WITH LINEAR CONTROL BEHAVIOR

CROSS REFERENCES TO RELATED APPLICATIONS

This application is a continuation of international patent application PCT/EP2013/069773 filed on Sep. 24, 2013 and published in German language as WO 2014/044861 A1, which international patent application claims priority from German patent application DE 10 2012 018 763 filed on Sep. 24, 2012.

BACKGROUND OF THE INVENTION

The present invention relates to a regulating slide valve apparatus having a housing which forms a duct through which a gaseous or liquid medium can flow and which has at least one inlet longitudinal portion and one outlet longitudinal portion, and having an adjustable regulating element for varying the flow cross section of the duct and adjusting the throughflow rate.

Regulating slide valve apparatuses of said type are used for example for regulating the aeration in sewage plants. Since approximately 60% of the energy consumption of sewage plants must be expended for the aeration of the sewage basins, there is great potential here in particular for reducing the energy consumption.

SUMMARY OF THE INVENTION

It is therefore the object of the present invention to reduce the energy consumption for the aeration of sewage basins of a sewage plant. In particular, it is an object to optimize, from an energy aspect, the regulating components required for controlling the aeration.

Said object is achieved in the case of the regulating slide valve apparatus mentioned in the introduction in that a seat ring element is provided in the duct, the regulating element has a first longitudinal portion which has a circular cross section with diameters that vary in the longitudinal direction, the regulating element is adjustable in the longitudinal direction of the duct, wherein the regulating element, in a closure position, lies against the seat ring element and closes the duct and, in an open position, forms an annular gap, through which flow can pass, with the seat ring element. Preferably, the varying diameters along the first longitudinal portion of the regulating element are configured such that the change in the cross-sectional area, through which flow can pass, of the annular gap varies linearly with the adjustment of the regulating element in the longitudinal direction. In particular, taking into consideration the dynamic plant pressure loss, the volume flow rate through the annular gap varies approximately linearly with the adjustment of the regulating element along the adjustment travel.

By contrast to plate-type slide valves hitherto used for regulating aeration, by means of which the duct, through which flow can pass, is varied by way of the displacement of a plate perpendicular to the flow direction, it is possible with the solution according to the invention for the pressure losses in the regulating path to be reduced considerably, such that energy costs can be saved as a result. Furthermore, with the regulating slide valve apparatus according to the invention, it is preferably the case that a regulation characteristic between the control variable and the air mass flow rate to be regulated is realized which is linear over the entire working range.

By contrast to plate-type slide valves which are displaced perpendicular to the flow direction, the adjustment of the regulating element takes place in the flow direction, wherein, during the opening process, an annular gap forms between the regulating element and the seat ring element, thus permitting an air flow from the inlet longitudinal portion into the outlet longitudinal portion. The turbulence in the region of said annular gap is considerably reduced in relation to that in a hitherto used plate-type slide valve, resulting in lower pressure losses.

In this case, the linear regulation characteristic arises from the specific design of an external contour, which together with the seat ring element defines the size of the annular gap, of the regulating element. The external contour of the regulating element is preferably adjustable. It can then be adapted to or coordinated with the operating situation.

In a preferred embodiment, the outlet longitudinal portion has a conical shape as viewed in longitudinal section, such that the flow cross-sectional area of the duct increases in the flow direction.

This measure leads to a further reduction in the pressure losses within the regulating slide valve apparatus, such that in this way the energy consumption can be further reduced. In particular, this measure permits an improved pressure build-up and thus pressure recovery downstream of the pressure loss at the annular gap.

In a preferred refinement, in the inlet longitudinal portion, there are provided flow-guiding plates which additionally condition the flow.

It is preferably the case that the regulating element is arranged in the region of the inlet longitudinal portion and is held such that it can be moved counter to the flow direction for opening purposes. It is furthermore preferably the case that the regulating element has a flow-optimized external contour which surrounds a cavity. It is preferably the case that one end of an output shaft projects into the cavity, the other end of which output shaft is situated in a gearing housing which is arranged in the outlet longitudinal portion. The external shape of the gearing housing is preferably of flow-optimized design.

Both the regulating element and the gearing housing are situated centrally within the duct, and the air flowing through the duct thus flows around them. By means of a flow-optimized shape of said two elements, pressure losses and thus energy losses can be further reduced because the flow is conducted in targeted fashion to the delimiting internal wall of the outlet longitudinal portion. The internal wall of the outlet longitudinal portion preferably has an opening angle of 10° or less, more preferably of 5° to 6°. The regulating element and the gearing housing may be of multi-part form, composed in particular of multiple segments, such that the optimum shape can be realized more easily from a manufacturing aspect.

It is preferably the case that, within the gearing housing, there is provided an angle drive for coupling an input shaft, which is guided into the gearing housing obliquely with respect to the longitudinal axis, to the output shaft. The output shaft preferably runs within a shaft housing which extends from the regulating element to the gearing housing. The output shaft is preferably coupled, within the regulating element, to a conversion element such that a rotational movement of the output shaft is converted into a translational movement of the regulating element. The input axle is preferably coupled to a hydraulic, pneumatic or electric actuating motor.

These measures collectively lead to a further improvement in energy consumption because a unit composed of regulating element, shaft housing and gearing housing is formed within the duct, wherein the air flowing through flows around said unit with very low friction.

In a preferred refinement, the conversion element comprises a threaded spindle element. This is a particularly simple and effective means for converting a rotational movement into a translational movement.

It is particularly preferably the case that the conversion element comprises not only the threaded spindle element but also a play readjustment element, such that any wear that occurs in the threaded spindle element can be compensated.

In a preferred refinement, a flange is arranged on each of the two ends of the housing. It is furthermore preferably the case that the pipe diameters of the ends are adapted to the customary diameters of pipelines.

This has the advantage that the regulating slide valve apparatus can be very easily incorporated into existing pipelines.

In a preferred refinement, at least one sensor element is provided within the inlet longitudinal portion.

The special configuration of the inlet longitudinal portion and of the regulating element results in very low turbulence and in highly uniform homogenous flow conditions in the circumferential direction within the duct, regardless of the extent to which the regulating element is opened. It is thus possible to realize very precise and reliable measurement, for example of the pressure and/or of the flow.

It is particularly preferably the case that at least three guide elements are provided which are distributed uniformly in the circumferential direction of the duct and which furthermore likewise have a flow-optimized shape.

It is self-evident that the features mentioned above and the features yet to be discussed below may be used not only in the respectively specified combination but also in other combinations or individually without departing from the scope of the present invention.

BRIEF DESCRIPTION OF THE FIGURES

Further advantages and embodiments of the invention will emerge from the description and from the appended drawing, in which.

DESCRIPTION OF PREFERRED EMBODIMENTS

Figure 1:
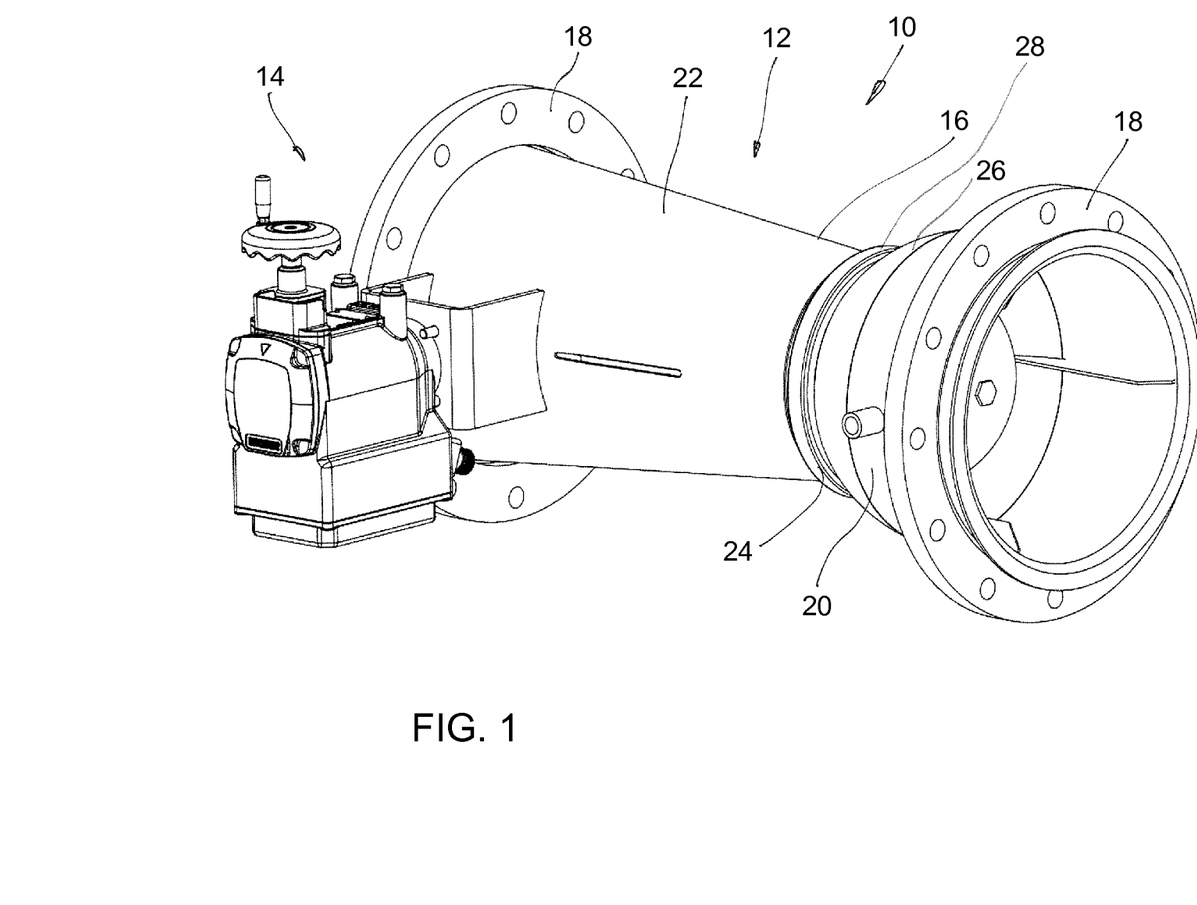
FIG. 1 is a perspective illustration of a regulating slide valve apparatus.

FIG. 1 shows a regulating slide valve apparatus which is denoted by the reference sign 10. The regulating slide valve apparatus 10 (hereinafter referred to for short as regulating slide valve) comprises a flow duct component 12 and a fitting component 14, wherein the flow duct component 12 is inserted into an aeration pipe which conducts air for example into a sewage basin of a sewage plant. The fitting component is mechanically connected to the flow duct component and serves for permitting adjustment of an element, to be discussed further below, in the flow duct component.

The flow duct component 12 has a housing 16 which bears a flange 18 on each of its two longitudinal ends, such that the flow duct component 12 can be easily installed into a pipeline.

The housing 16 is divided into multiple housing longitudinal portions, specifically an inlet longitudinal portion 20 and an outlet longitudinal portion 22. Between said two longitudinal portions there is provided a further longitudinal portion 24, in the region of which an adjustment of the air flow rate passing through the flow duct component from the inlet side to the outlet side is performed. Said three housing longitudinal portions are preferably provided as separate housing parts.

It can be seen from FIG. 1 that the outlet longitudinal portion is of cylindrical form, wherein the diameter increases in the flow direction, resulting in a conical shape. Said conical shape of the outlet longitudinal portion 22 can be seen once again and more clearly in FIG. 2.

Figure 2:
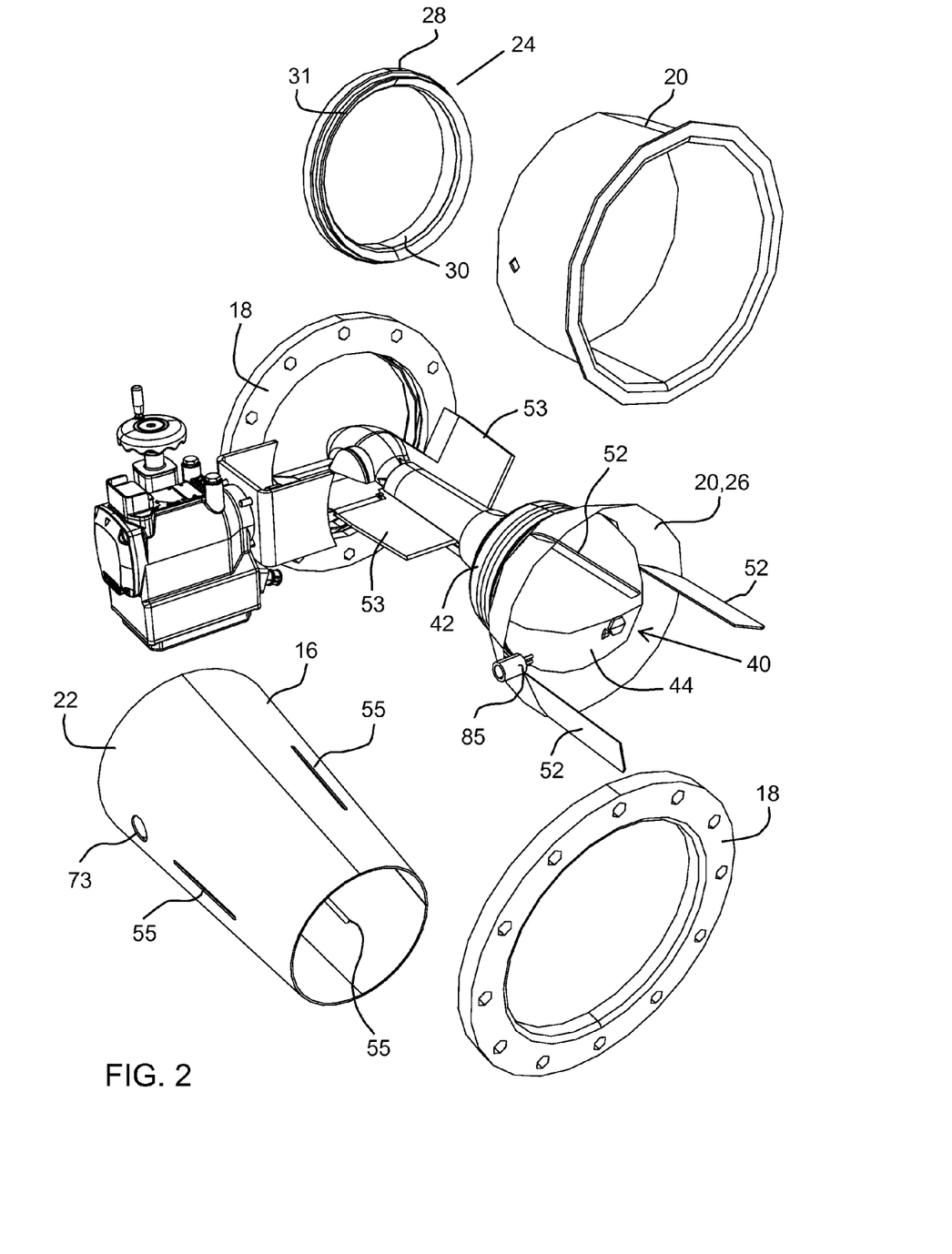
FIG. 2 shows the regulating slide valve apparatus from FIG. 1, with some components removed in the form of an exploded illustration.

Like the outlet longitudinal portion 22, the inlet longitudinal portion 20 is of rotationally symmetrical form and has a section 26 which tapers in the direction of the longitudinal portion 24.

The third longitudinal portion 24 serves as a seat ring 28, which has an external contour 31 which interacts with the tapering section 26 of the inlet longitudinal portion. The forward end of the section 26 is mounted onto the longitudinal portion 24, such that said end of the section 26 bears sealingly against the external contour 31.

As can be seen in FIG. 2, the seat ring 28 has a further ring surface 30 which serves as a seat for a regulating element which is denoted generally in FIG. 2 by the reference sign 40.

The regulating element 40 is preferably designed to be rotationally symmetrical with respect to the longitudinal axis and is divided into multiple sections, specifically a valve section 42 and an approximately hemispherical section 44. The valve section 42 has, as viewed in the longitudinal direction, an external contour with a diameter which varies in stepped or continuous fashion, wherein the diameters decrease in the direction of the seat ring 28. The greatest diameter is in a region adjacent to the hemispherical section 44, and is adapted to the diameter of the ring surface 30 of the seat ring 28. The ring surface 30 is, so to speak, designed as a valve seat for the valve section 42.

The regulating element 40 can be moved in the longitudinal direction such that the valve section 42 moves relative to the seat ring 28 and thus the ring surface 30. In the exemplary embodiment shown in FIG. 2, a movement takes place, counter to the flow direction, to the right, such that the valve section 42 moves out of its seat on the ring surface 30 and opens an annular gap. The annular gap is thus formed between the ring surface 30 of the seat ring 28 and the opposite region of the valve section 42.

The size of said annular gap, that is to say the area of the cross section through which flow passes, increases as the regulating element 40 moves to the right, as the diameters of the valve section 42 become smaller and thus the distance to the ring surface 30 opposite becomes greater.

Through the interaction of the seat ring 28 and of the displaceable valve section 42 of the regulating element 40, it is consequently possible for the cross-sectional area through which flow passes to be varied, and for throughflow rate control and/or regulation to thus be realized.

The cross-sectional area, through which flow can pass, of the annular gap preferably varies linearly with the adjustment travel, that is to say with the adjustment of the regulating element in the longitudinal direction. This linearity can be attained through suitable selection of the various diameters of the valve section 42. In particular, the diameters are selected such that, taking into consideration the dynamic plant pressure loss, the volume flow rate through the annular gap varies approximately linearly with the adjustment of the regulating element along the adjustment travel. The various diameters can be calculated.

In a preferred embodiment, the external contour of the valve section 42 is adjustable, such that the various diameters can be adapted.

It can also be seen from FIG. 2 that multiple, preferably three, guide plates or flow guide plates 52 are provided within the inlet longitudinal portion 20. Said guide plates 52 are attached to the inner side of the inlet longitudinal portion 20 and extend preferably radially inward. The multiple guide plates 52 are distributed uniformly in the circumferential direction.

Within the housing 16, in particular within the outlet longitudinal portion 22, there are provided further guide plates 53 which extend radially inward from the inner side of the outlet longitudinal portion 22. In FIG. 2, slots 55 are formed in the housing 16, that is to say in the outlet longitudinal portion 22, into which slots the guide plates 53 can engage. The respective radially inner side of a guide plate 53 is connected to an inner shaft housing, which will be discussed in more detail further below with reference to FIG. 5. Said guide plates also serve for fixing and rotationally securing the shaft housing relative to the housing 16.

Figure 3:
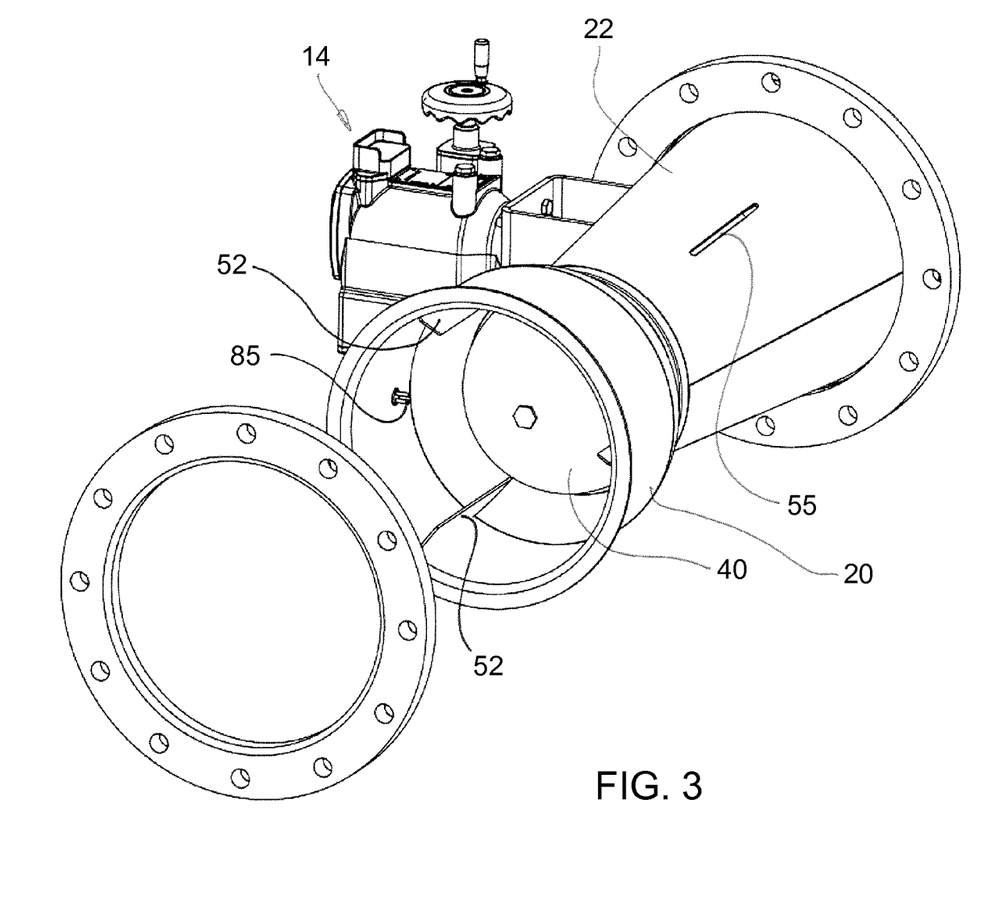
FIG. 3 shows the regulating slide valve apparatus as per FIG. 1, with a flange removed.

FIG. 3 shows the inlet longitudinal portion 20 once again from a slightly different perspective. Here, it is possible to clearly see the guide plates 52, which project radially inward and which furthermore extend in the longitudinal direction toward the regulating element 40.

In the inlet longitudinal portion there is also provided a sensor 85, in particular a measurement probe 85, which projects through an opening in the inlet longitudinal portion into the interior space.

The drive for adjusting the regulating element 40 in the longitudinal direction will be described hereinbelow with reference to FIG. 4.

Figure 4:
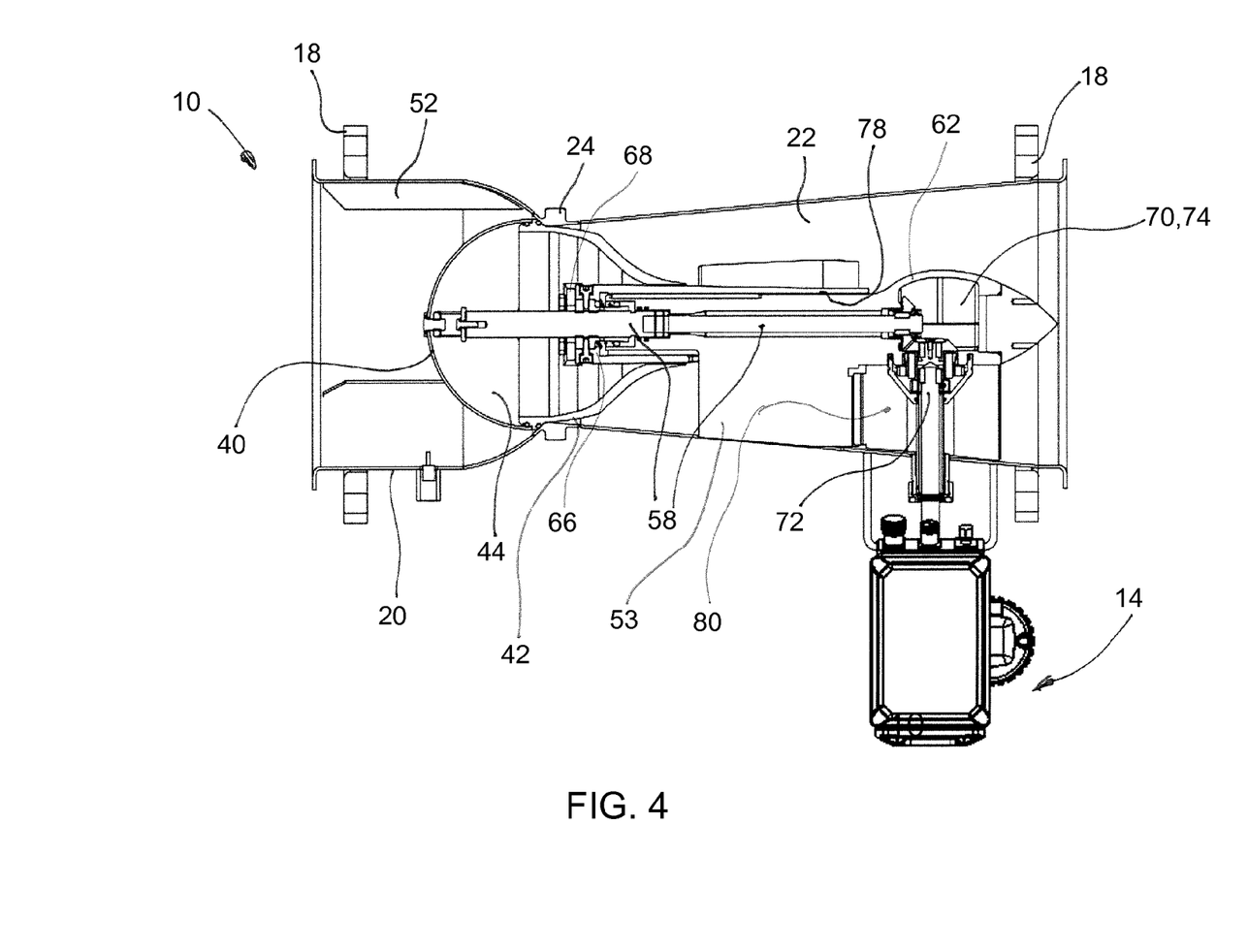
FIG. 4 is a sectional illustration of the regulating slide valve apparatus.

FIG. 4 shows the regulating slide valve 10 in a sectional illustration, with the section plane running parallel to the longitudinal axis.

Firstly, it can be clearly seen from FIG. 4 that the regulating element 40 is of hollow form and accommodates various elements in the cavity. For example, one end of an output shaft 58, which extends centrally with respect to the two longitudinal portions 20 and 22 and the other end of which ends in a gearing housing 62, projects into said cavity of the regulating element 40.

Within the cavity of the regulating element 40 there is preferably provided a threaded spindle 66 which is designed for converting a rotational movement of the output shaft 58 into a translational movement of the regulating element 40 in the longitudinal direction. For this purpose, the output shaft 58 has a threaded section which interacts with a spindle nut 68, wherein the spindle nut 68 is fixedly coupled to the regulating element 40. When the output shaft 58 rotates, the spindle nut 68 is correspondingly moved in the longitudinal direction. The spindle nut is preferably equipped with a play readjustment means, which preferably has a spring.

The output shaft 58 is driven within the gearing housing 62 by way of a diverting apparatus 70 which couples an input shaft 72, which is arranged obliquely or perpendicularly with respect to the longitudinal direction, to the output shaft 58. In the present exemplary embodiment, the diverting apparatus is a bevel gear mechanism 74.

At this juncture, it is however pointed out that other diverting apparatuses are conceivable, examples of which include a worm gear drive, a planetary gear set, a shaft joint or Vexier joints with or without a helical coupling.

The output shaft 58 is guided within a shaft housing 78 which extends between the regulating element 40 and the gearing housing 62. This construction will be discussed in detail with reference to FIG. 5.

The input shaft 72 extends into the fitting component 14 and is connected there to a mechanical or motorized actuating element in order to be able to move the regulating element 40 in the longitudinal direction.

As can be clearly seen from FIG. 4, the regulating element 40, the shaft housing 78 and the gearing housing 62 form a unit which is preferably arranged centrally within the inlet longitudinal portion and/or the outlet longitudinal portion and thus within the flow duct. For this reason, said unit is to the greatest possible extent of flow-optimized design, such that it has a positive influence on the flow behavior of the air flowing through the flow duct component 12.

In particular, the shaft housing 78 and the gearing housing 62 have a flow-calming action, such that the air flowing through the annular gap thereafter flows with the least possible friction along the internal wall of the outlet longitudinal portion 22, wherein the conical profile of the outlet longitudinal portion 22 in the flow direction additionally has the effect that pressure can be built up again by way of reduction of the flow speed.

It is thus achieved that the pressure drop between the inlet side and the outlet side of the flow duct component 12 is very small. The pressure loss occurring at the annular gap is virtually compensated in the outlet longitudinal portion 22 by way of the measures specified above. Consequently, pressure recovery is realized by way of the selected geometry.

The unit composed of gearing housing 62, shaft housing 78 and regulating element 40 is provided preferably centrally within the flow duct formed by the inlet longitudinal portion and the outlet longitudinal portion by means of a support element 80 which supports the unit in the region of the gearing housing 62 on the outlet longitudinal portion 22. The support element 80 runs preferably radially inward and has a flow-optimized design such that its flow resistance is as low as possible. Furthermore, the support element 80, by way of its shape, may be used for imparting a flow-calming and direction-defining action.

For the measurement of pressures or flow speeds, measurement sensors are provided within the flow duct component 12. A measurement sensor of said type is schematically illustrated and denoted by the reference sign 85 in FIG. 2. Said measurement sensor 85 is provided in the inlet longitudinal portion, wherein said measurement sensor may be positioned as desired in the circumferential direction. This is owing to the fact that the flow conditions within the inlet longitudinal portion and thus also the pressure conditions are very homogenous. This arises from the fact that the air flows through the annular gap uniformly in the circumferential direction, and the hemispherical shape of the section 44 of the regulating element 40 for stable flow conditions ensures a uniform homogenous pressure distribution owing to the ram effect. Further measurement sensors may be provided within the flow duct component, for example in the outlet longitudinal portion 22.

Figure 5:
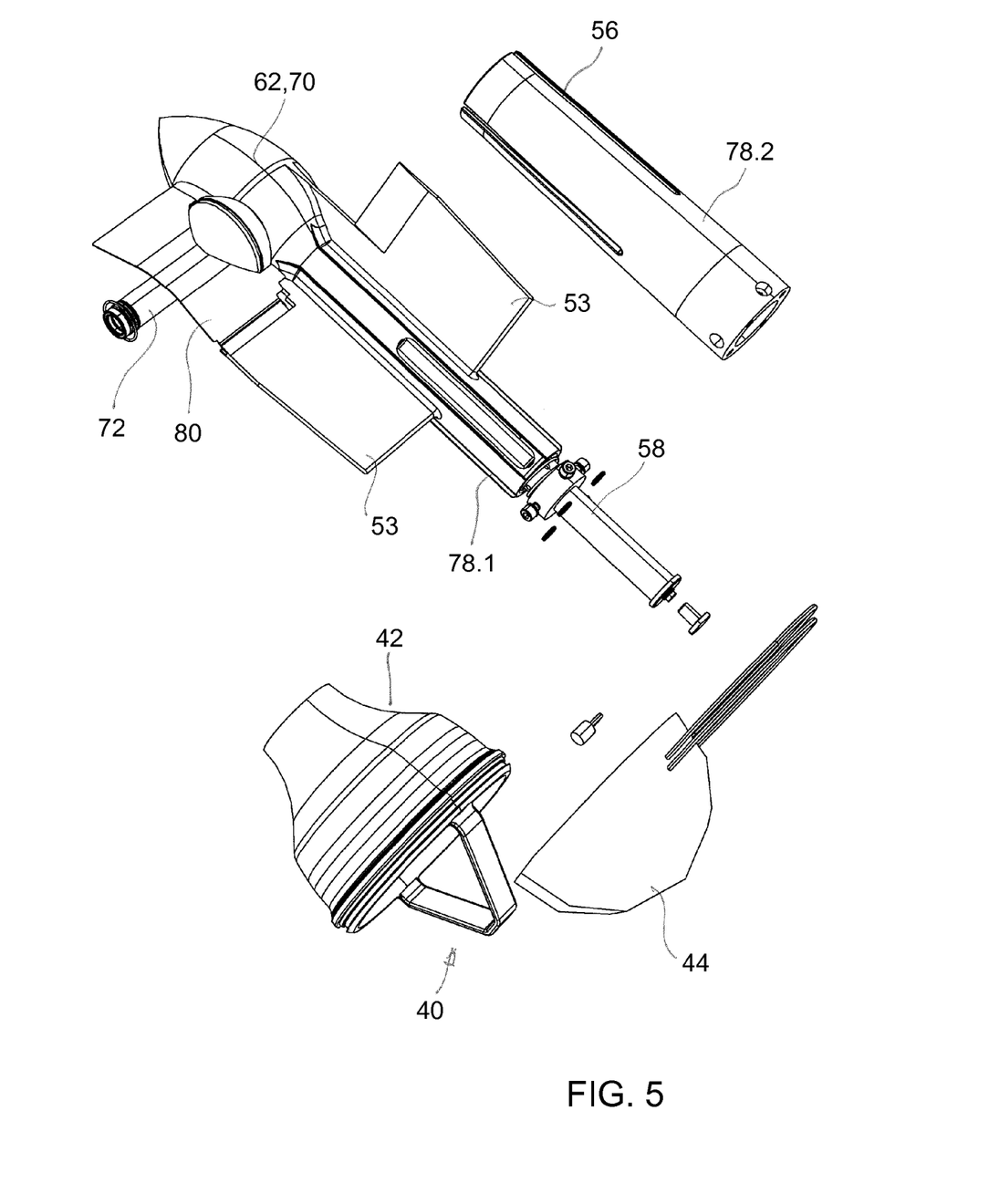
FIG. 5 is a schematic perspective illustration of an assembly of the regulating slide valve apparatus.

The drive assembly which comprises, inter alia, the regulating element 40, the output shaft 58, the gearing housing 62 and the shaft housing 78 is illustrated again, in more detail, in FIG. 5. The shaft housing 78 comprises two housing parts 78.1 and 78.2 which are held so as to be movable relative to one another, wherein the housing part 78.1 is connected to the gearing housing 62 and the other housing part 78.2 is connected to the regulating element 40, in particular to the section 44. The internal diameter of the housing part 78.2 is greater than the external diameter of the housing part 78.1. This dimensioning makes it possible for the housing part 78.2 to be pushed onto the housing part 78.1. By means of this embodiment, it is possible for the housing part 78.2 to be moved, in particular in guided fashion, in the longitudinal direction relative to the other housing part 78.1. For good guidance of the two housing parts 78, it is for example possible for slide strips to be provided on one and/or both housing parts.

To prevent a relative rotation of the two housing parts 78, the guide plates already described above are provided, said guide plates being attached to the housing part 78.1 and interacting with correspondingly provided slots 56 in the housing part 78.2. Said slots 56 run in the longitudinal direction and are designed to be open at the edge facing toward the gearing housing 62.

When the regulating element 40 is adjusted in the longitudinal direction, the housing part 78.2 likewise moves relative to the housing part 78.1 and ensures the required guidance and prevention of relative rotation.

Altogether, a regulating slide valve apparatus is thus realized which operates with considerably lower pressure losses than the previous solutions and which is thus more energy-efficient. Said energy efficiency is attained in particular by way of the particular arrangement of regulating element and drive. The shaft housing 78 and the gearing housing 62 considerably improve the flow after it passes through the annular gap, such that a large pressure build-up is possible very rapidly and within a short distance. This in turn has the result that the regulating slide valve apparatus can be designed so as to be of short construction.

Figure 6:
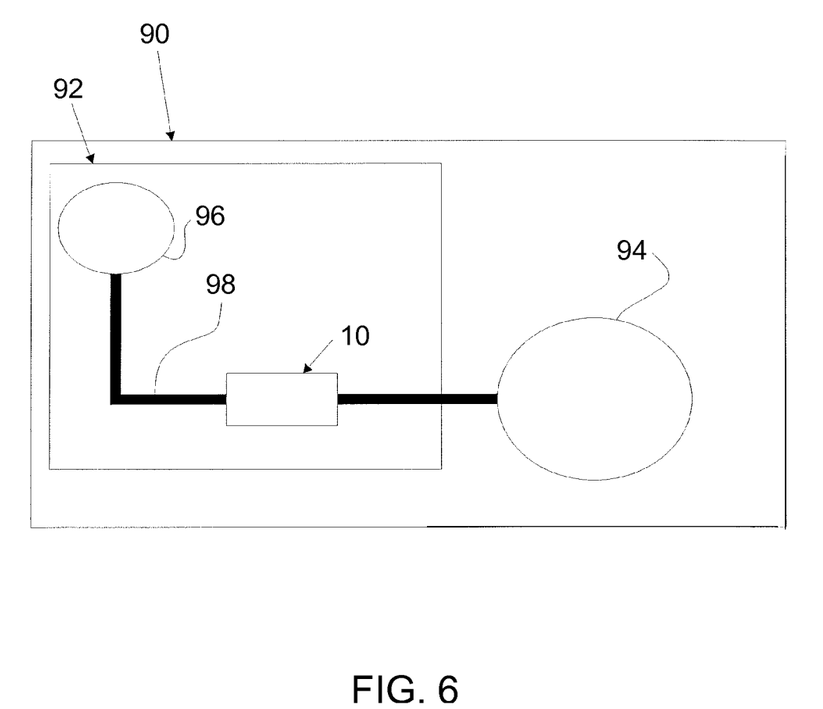
FIG. 6 is a schematic illustration of a sewage plant.

The described regulating slide valve apparatus is particularly well suited to use in aeration systems for sewage plants. FIG. 6 schematically shows a sewage plant 90 with an aeration system 92, which comprises at least one compressor system 96 and pipelines 98, and a sewage basin 94. The regulating slide valve apparatus 10 can be incorporated into existing pipelines 98 with relatively little outlay for the previous devices, such that the stated energy savings can be achieved even for existing sewage plants. Owing to the low pressure losses, the compressor system 96, which introduces air into pipelines 98, can be operated with a lower outlet pressure and consequently with lower electrical power.

What is claimed is:
1. A regulating slide valve apparatus having
a housing which forms a duct through which a gaseous or liquid medium can flow and which has at least an inlet longitudinal portion and an outlet longitudinal portion,
an adjustable regulating element for varying the flow cross section of the duct and adjusting the throughflow rate, wherein
a seat ring element is provided in the duct, the regulating element has a first longitudinal portion which has a circular cross section with diameters that vary in the longitudinal direction,
the regulating element is adjustable in the longitudinal direction of the duct along an adjustment travel, wherein the regulating element, in a closure position, lies against the seat ring element and closes the duct and, in an open position, forms an annular gap, through which flow can pass, with the seat ring element,
the varying diameters along the first longitudinal portion of the regulating element are configured such that the change in the cross-sectional area, through which flow can pass, of the annular gap with the adjustment of the regulating element in the longitudinal direction is such that the volume flow through the annular gap varies approximately linearly with the adjustment of the regulating element along the adjustment travel, and
the outlet longitudinal portion has a conical shape as viewed in longitudinal section, such that the flow cross-sectional area of the duct increases in the flow direction.

2. The regulating slide valve apparatus as claimed in claim 1, wherein the regulating element is arranged in the region of the inlet longitudinal portion and can be moved counter to the flow direction for opening purposes.

3. The regulating slide valve apparatus as claimed in claim 1, wherein the regulating element has a flow-optimized external contour which surrounds a cavity.

4. The regulating slide valve apparatus as claimed in claim 3, wherein one end of an output shaft projects into the cavity, the other end of which output shaft is situated in a gearing housing which is arranged in the outlet longitudinal portion.

5. The regulating slide valve apparatus as claimed in claim 4, wherein the external shape of the gearing housing is of flow-optimized design.

6. The regulating slide valve apparatus as claimed in claim 5, wherein, within the gearing housing, there is provided an angle drive for coupling an input shaft, which is guided into the housing obliquely or perpendicular with respect to the longitudinal axis, to the output shaft.

7. The regulating slide valve apparatus as claimed in claim 4, wherein the output shaft runs within a housing which extends from the regulating element to the gearing housing.

8. The regulating slide valve apparatus as claimed in claim 4, wherein the output shaft is coupled, within the regulating element, to a conversion element such that a rotational movement of the output shaft is converted into a translational movement of the regulating element.

9. The regulating slide valve apparatus as claimed in claim 8, wherein the conversion element comprises a threaded spindle element.

10. The regulating slide valve apparatus as claimed in claim 6, wherein the input shaft is connected to a fitting drive.

11. The regulating slide valve apparatus as claimed in claim 1, wherein a flange is arranged on each of the two ends of the housing.

12. The regulating slide valve apparatus as claimed in claim 1, wherein at least one sensor element is provided within the inlet longitudinal portion.

13. The regulating slide valve apparatus as claimed in claim 1, wherein the design of the housing in the inlet longitudinal portion is adapted, at least in sections, to the design of the regulating element.

14. The regulating slide valve apparatus as claimed in claim 13, wherein, in the inlet longitudinal portion, the housing tapers toward the seat ring element.

15. An aeration system of a sewage plant for the introduction of activation air into a biological sewage basin, having a compressor apparatus and having an aeration pipe apparatus which is designed for introducing activation air delivered by the compressor apparatus into the sewage basin, characterized by a regulating slide valve apparatus as claimed in claim 1, which regulating slide valve apparatus is provided in the aeration pipe apparatus in order to control the mass flow rate.

16. A regulating slide valve apparatus having a housing which forms a duct through which a gaseous or liquid medium can flow and which has at least an inlet longitudinal portion and an outlet longitudinal portion,     an adjustable regulating element for varying the flow cross section of the duct and adjusting the throughflow rate, wherein         a seat ring element is provided in the duct,     the regulating element has a first longitudinal portion which has a circular cross section with diameters that vary in the longitudinal direction,     the regulating element is adjustable in the longitudinal direction of the duct along an adjustment travel, wherein the regulating element, in a closure position, lies against the seat ring element and closes the duct and, in an open position, forms an annular gap, through which flow can pass, with the seat ring element,     the varying diameters along the first longitudinal portion of the regulating element are configured such that the change in the cross-sectional area, through which flow can pass, of the annular gap with the adjustment of the regulating element in the longitudinal direction is such that the volume flow through the annular gap varies approximately linearly with the adjustment of the regulating element along the adjustment travel, and     in the inlet longitudinal portion, there are provided flow-guiding plates which condition the flow.

* * * * *